United States Patent
Wang et al.

(10) Patent No.: US 8,984,266 B2
(45) Date of Patent: Mar. 17, 2015

(54) TECHNIQUES FOR STOPPING ROLLING REBOOTS

(75) Inventors: Bei Wang, Palo Alto, CA (US); Xiaohui Lu, Fremont, CA (US); Geng Tian, Cupertino, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 603 days.

(21) Appl. No.: 13/085,330

(22) Filed: Apr. 12, 2011

(65) Prior Publication Data
US 2012/0173859 A1 Jul. 5, 2012

Related U.S. Application Data

(60) Provisional application No. 61/428,117, filed on Dec. 29, 2010.

(51) Int. Cl.
*G06F 9/00* (2006.01)
*G06F 9/44* (2006.01)

(52) U.S. Cl.
CPC .................................. *G06F 9/4401* (2013.01)
USPC .................................................. 713/2; 713/1

(58) Field of Classification Search
USPC ........................................................ 713/1, 2
See application file for complete search history.

(56) References Cited

U.S. PATENT DOCUMENTS

| | | | |
|---|---|---|---|
| 5,590,329 A | 12/1996 | Goodnow, II et al. | |
| 6,085,296 A | 7/2000 | Karkhanis et al. | |
| 6,175,917 B1 * | 1/2001 | Arrow et al. | 713/1 |
| 6,973,597 B2 * | 12/2005 | Schroath et al. | 714/44 |
| 7,188,237 B2 | 3/2007 | Zhou et al. | |
| 7,266,823 B2 | 9/2007 | Alford, Jr. | |
| 7,340,638 B2 * | 3/2008 | Nicholson et al. | 714/6.11 |
| 7,516,362 B2 | 4/2009 | Connellt et al. | |
| 8,490,103 B1 | 7/2013 | Belady et al. | |
| 2003/0145133 A1 | 7/2003 | Pelly et al. | |
| 2004/0003222 A1 * | 1/2004 | Rich et al. | 713/1 |
| 2005/0235127 A1 | 10/2005 | Muthiah et al. | |
| 2005/0240747 A1 | 10/2005 | Raut | |
| 2006/0026279 A1 | 2/2006 | Zigmond et al. | |
| 2006/0253568 A1 | 11/2006 | Lin | |
| 2007/0113062 A1 * | 5/2007 | Osburn et al. | 713/1 |
| 2007/0162558 A1 | 7/2007 | Alam et al. | |
| 2007/0192581 A1 * | 8/2007 | Challener et al. | 713/2 |
| 2008/0133749 A1 | 6/2008 | Sample | |
| 2009/0100170 A1 | 4/2009 | Schneider et al. | |
| 2009/0106741 A1 | 4/2009 | Dageville et al. | |
| 2011/0107386 A1 * | 5/2011 | de los Reyes et al. | 725/118 |
| 2011/0271088 A1 * | 11/2011 | Princen et al. | 713/2 |
| 2012/0173713 A1 | 7/2012 | Wang et al. | |

OTHER PUBLICATIONS

Non-Final Office Action for U.S. Appl. No. 13/235,245 mailed on Apr. 12, 2013, 12 pages.
Non-Final Office Action for U.S. Appl. No. 13/235,245 mailed on Sep. 18, 2014, 15 pages.

* cited by examiner

*Primary Examiner* — Zahid Choudhury
(74) *Attorney, Agent, or Firm* — Kilpatrick Townsend & Stockton LLP (57) ABSTRACT

Techniques for detecting rolling reboots and for taking responsive actions to stop rolling reboots.

24 Claims, 3 Drawing Sheets

TECHNIQUES FOR STOPPING ROLLING REBOOTS

CROSS-REFERENCES TO RELATED APPLICATIONS

The present application is a non-provisional of and claims the benefit and priority under 35 U.S.C. 119(e) of U.S. Provisional Application No. 61/428,117, filed Dec. 29, 2010, entitled TECHNIQUES FOR STOPPING ROLLING REBOOTS, the entire contents of which are incorporated herein by reference for all purposes.

BACKGROUND

The present application relates to processor-based systems, and more particularly to techniques for stopping rolling reboots in processor-based systems.

A processor or CPU-based system may unexpectedly boot or reboot due to various conditions. These conditions may be caused by software executed by the system or may originate from the system's hardware. If the condition causing the reboot is not corrected, the system may experience multiple reboots over a short period of time causing the system to become unstable and potentially unusable. In most such scenarios the only way to recover from a rolling reboot condition is to pull power from the system and send the system for diagnosis. For example, if a network device that has been deployed in the field experiences a rolling reboot condition, there is generally no way to recover from the rolling reboot condition in the field. Instead, when such a condition occurs in the field, the entire network device or the part of the device comprising the processor (e.g., a blade on the network device) experiencing a rolling reboot condition has to be sent for diagnosis. This causes the network device to experience significant downtime—an undesired scenario for the user of the network device and also for the manufacturer/vendor of the network device.

BRIEF SUMMARY

Embodiments of the present invention provide techniques for detecting rolling reboots and for taking responsive actions to stop rolling reboots.

In one embodiment, as part of a boot sequence, processing is performed to determine, based upon historical information, whether a rolling reboot condition exists. The historical information may comprise information related to one or more boots previously performed by a system processor. Whether or not a software component is loaded into the volatile memory as part of the boot sequence is then determined based upon whether the rolling reboot condition is determined to exist.

In one embodiment, the software component is loaded into the volatile memory upon determining that the condition does not exist. However, if it is determined that the rolling reboot condition exists, then the software component is not loaded into the volatile memory as part of the boot sequence.

In one embodiment, a preconfigured threshold may be used to determine whether a rolling reboot condition exists. In such an embodiment, the historical information may be used to determine a number of boots of a particular kind that have occurred in a specific period of time. This number may then be used to determine whether the rolling reboot condition exists. In one embodiment, a rolling reboot condition may be determined to exist if the number of boots of the particular kind equals or exceeds the preconfigured threshold.

Various different actions may be performed upon determining that a rolling reboot condition exists. For example, in one embodiment, the system may be put in a special mode of operation. A set of user-selectable options may also be provided when a rolling reboot condition is detected. Examples of options include an option to gather diagnostic data, an option to reboot using an alternate partition, an option to reboot using a default software image or default configuration, and the like.

In another embodiment, as part of a boot sequence, historical information is accessed, where the historical information comprises information related to one or more boots performed by a processor. The historical information is used to determine a number of boots of a particular kind that have occurred in a specific period of time. A determination is then made, based upon the number of boots, whether or not to load a software component into volatile memory associated with the processor. In one embodiment, the number of boots is compared to a preconfigured threshold, and whether or not to load the software component into the volatile memory is determined based upon the comparison. In one embodiment, the software component is not loaded into the volatile memory upon determining that the number of boots equals or exceeds the preconfigured threshold.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Figure 1:
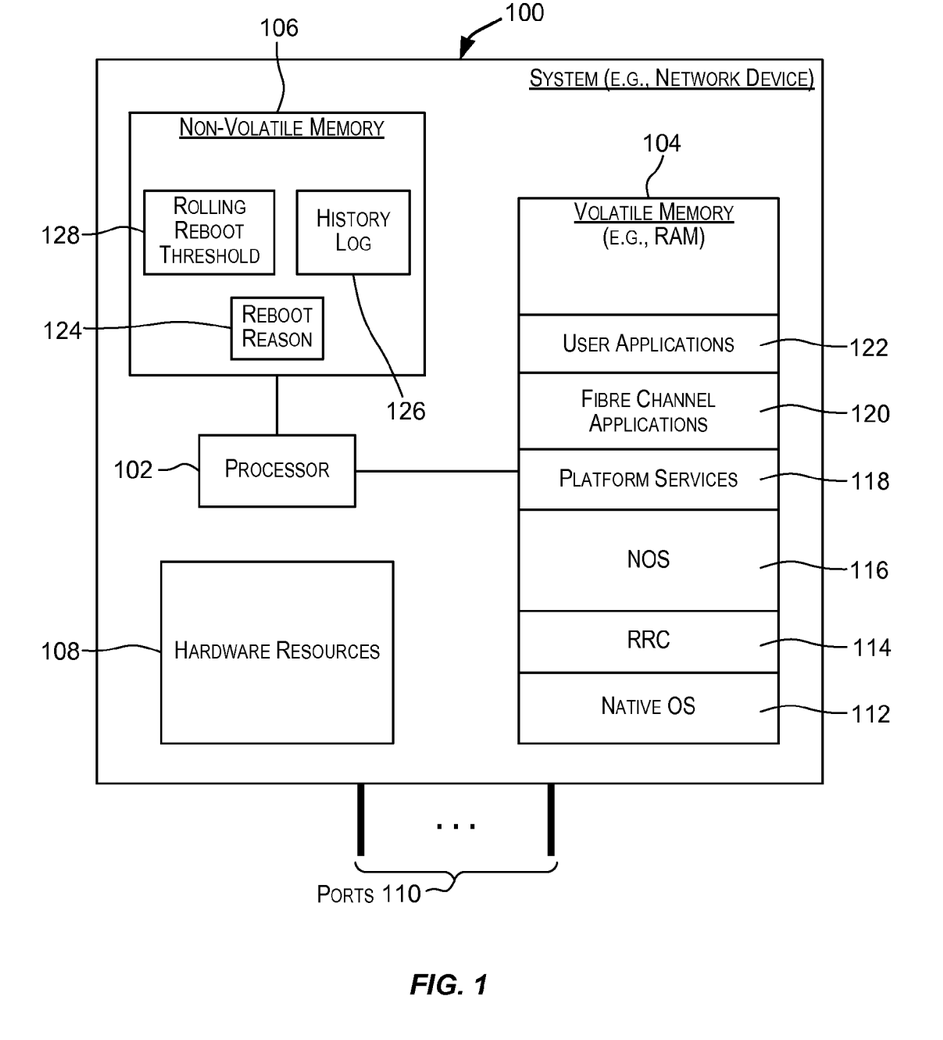
FIG. 1 is a simplified block diagram of a system that may incorporate an embodiment of the present invention.

FIG. 1 is a simplified block diagram of a system 100 that may incorporate an embodiment of the present invention. System 100 may be any system that comprises at least one processor. In FIG. 1, system 100 is embodied as a network device. Examples of a network device include but are not limited to a switch, a router, or any other device that facilitates forwarding of data. For example, system 100 may be a Fibre Channel switch, an Ethernet switch or router provided by Brocade Communications Systems, Inc. of San Jose, Calif. The components of system 100 depicted in FIG. 1 are meant for illustrative purposes only and are not intended to limit the scope of the invention in any manner. Alternative embodiments may have more or fewer components than those shown in FIG. 1.

As a network device, system 100 may be configured to receive and forward traffic. System 100 may support various different communication protocols for forwarding data including Fibre Channel technology protocols, Ethernet-based protocols (e.g., Gigabit Ethernet protocols), Transmission Control/Internet Protocol-based protocols, and others. The communication protocols may include wired and/or wireless protocols.

In the embodiment depicted in FIG. 1, system 100 comprises a processor 102 with associated volatile memory 104, non-volatile memory 106, hardware resources 108, and one or more ports 110. Ports 110 represent the input/output plane of system 100. System 100 may receive and forward data (e.g., packets) using ports 110. A port within ports 110 may be classified as an input port or an output port depending upon whether system 100 receives or transmits a packet using the port. A port over which a packet is received by system 100 is referred to as an input port. A port used for communicating or forwarding a packet from system 100 is referred to as an output port. A particular port may function both as an input port and an output port. A port may be connected by a link or interface to a neighboring network device or network. Ports 110 may be capable of receiving and/or transmitting different types of data traffic at different speeds including 1 Gigabit/sec, 10 Gigabits/sec, 40 Gigabits/sec, 100 Gigabits/sec, or more or less speeds. In some embodiments, multiple ports may be logically grouped into one or more trunks.

System 100 may comprise one or more hardware resources 108. These hardware resources may include resources that facilitate data forwarding functions performed by system 100. Hardware resources 108 may also include one or more devices associated with system 100.

Processor 102 is configured to execute software that controls the operations of system 100. Processor 102 may be any processor or CPU such as a PowerPC, Intel, AMD, or ARM microprocessor, operating under the control of software loaded into volatile memory 104. The software may be in the form of programs/code/instructions that are loaded into volatile memory 104 and executed by processor 102. Volatile memory 104 is typically a random access memory (RAM) and sometimes referred to as system memory.

Non-volatile memory 106 may be of different types including a compact flash, a hard disk, an optical disk, and the like. Information that is to be persisted across reboot conditions or across power-down conditions may be stored in non-volatile memory 106. Additionally, non-volatile memory 106 may also store programs/code/instructions that are to be loaded in RAM 104 and executed by processor 102 and also any related data constructs.

In one embodiment, non-volatile memory 106 may store a software boot image that is used for loading software components into RAM 104 upon a reboot. Booting or rebooting a system comprises performing a sequence of actions referred to as the boot sequence. The boot sequence includes loading an operating system into the system's volatile memory. For example, the boot sequence for booting system 100 comprises a sequence of actions including loading an operating system 112 in RAM 104 associated with processor 102. Various other software components may also be loaded into RAM 104 as part of the boot sequence. For purposes of this application the words boot and reboot are used synonymously.

In one embodiment, a boot/reboot that system 100 undergoes may be categorized as either an expected reboot or an unexpected reboot. An expected (intended) reboot is one that is user initiated/initialized, and initiated by the user through command line interface (CLI) commands or other user operations through software. Examples include a reboot initiated by a user to perform a firmware upgrade, a system reboot, a control processor board failover, and the like. An unexpected (or unintended) reboot is one that is not user initiated/initialized but is rather caused by some unexpected or error condition in the system. An unexpected reboot is one that is not initiated by a user operation through software, but occurs due to software or hardware failures, or unexpected events, like a power outage. A system power cycle reboot is considered as an unexpected reboot. Accordingly, based upon the cause(s) of a boot/reboot, the boot/reboot may be categorized as expected or unexpected.

Various conditions may cause a system such as system 100 to boot or reboot. For example, conditions that cause unexpected reboots in system 100 may include conditions occurring due to the software executed by processor 102 of system 100, conditions originating in hardware resources 108 of system 100, power glitches, problems occurring in other components of system 100, and the like. The unexpected reboots may include warm reboots and/or cold reboots. Whether a reboot is categorized as an expected reboot or an unexpected reboot may vary from one system to another. In one embodiment, a user of system 100 can configure, based upon the conditions that cause the system to boot/reboot, whether the boot/reboot is to be categorized as expected or unexpected for purposes of processing described below.

Examples of conditions that may trigger an unexpected boot include but are not restricted to kernel panic, daemon panic, hardware failure, loss of heartbeat, power glitch, ping-ponging between multiple processors in a multiprocessor system, a system reset, and the like. The following Table A gives examples of conditions that may trigger reboots that are categorized as unexpected reboots in one embodiment.

TABLE A

Examples of conditions that cause unexpected reboots

| Condition | Description |
| --- | --- |
| Reset | A system reset may be caused by various conditions such as an unexpected power-cycle of the system (e.g., due to a power glitch), an operating system (e.g., Linux) boot command failure, a hardware watchdog timeout, loss of heartbeat, a condition caused by an error in software, and the like. A hardware watchdog timer is typically a hardware timing device that triggers a system reset when critical kernel modules fail to function correctly. |
| Software fault: kernel panic | When the system detects an internal fatal error (e.g., an error in the network operating system (NOS) kernel) from which it cannot recover safely, it will output an error message, dump a stack trace for post-mortem debugging and then trigger an automatic reboot. |
| Software fault | Various software-related faults may cause an unexpected automatic reboot to occur. One such scenario is when a daemon fails to refresh the software watch dog (SWD) for a certain period of time, or the daemon's crash is detected by the SWD. |

TABLE A-continued

Examples of conditions that cause unexpected reboots

| Condition | Description |
|---|---|
| Software fault: Software watchdog | A timeout of the software watchdog. |
| Software fault: ASSERT | Error caused by software ASSERT. Error caused by software fatal errors, like accessing data by a NULL point or a conflict software states, and the like. |
| SWD panic | Panic situation in a software watch-dog (SWD). The SWD is generally a software module that monitors the health of software modules (e.g., . daemons and kernel threads) running in a system. |
| Software recovery failure | This may occur when the system is unable to recover to a stable state. For example, this may occur when the system is unable to load software to a usable stable state. |
| Miscellaneous reasons | Various other conditions may also cause reboots that are categorized as unexpected. |

As described above, various conditions may cause an unexpected reboot to occur in system 100. If the condition that causes the unexpected reboot is not resolved, the condition may persist and cause multiple reboots of system 100 (referred to as rolling reboots) in a short period of time. These rolling reboots may cause system 100 to become unstable and even non-functional. According to an embodiment of the present invention, techniques are provided that can detect a rolling reboot condition and then take appropriate actions to stop rolling reboots from occurring.

When a condition that triggers a reboot occurs in system 100, as part of the boot sequence, the system goes down and the contents of RAM 104 are cleared. In one embodiment, before the system goes down, a reason for the reboot (reboot reason 124) may be written to a section of non-volatile memory 106. Reboot reason 124 may not be written at each reboot. Whether or not a reboot reason is written may depend upon the condition causing the reboot. For example, a reboot reason may not be written if the reboot is triggered by certain hardware problems or a power glitch.

A boot sequence is executed by system 100 upon receiving a signal to perform a reboot/boot. The boot sequence comprises a series of actions that are performed upon receiving a reboot/boot signal. The boot sequence may be different from one system to another. In one embodiment, as part of the boot sequence, system 100 restarts, clears volatile memory (RAM) 104, and then loads software components into RAM 104 for execution by processor 102. The software components are typically loaded in a specific order. Generally, an operating system or kernel 112 (referred to henceforth as the "native operating system" to differentiate it from network operating system (NOS) 116) is loaded first followed by other software components. Native operating system 112 is generally a commercially available operating system such as Linux, Unix, Windows OS, a variant of the aforementioned operating systems, or other operating system.

In one embodiment, after native operating system 112 is loaded, a specialized software component 114 is loaded that comprises logic and instructions/code for performing processing for handling rolling reboots. Component 114 is henceforth referred to as rolling reboot component (RRC) 114. In one embodiment, after being loaded, processor 102 is configured to execute RRC 114, which causes the processor to perform rolling reboot-related processing. This processing comprises determining whether or not a rolling reboot condition exists in system 100 and then initiating appropriate actions based upon whether or not a rolling reboot condition is detected.

If processing resulting from execution of RRC 114 does not detect a rolling reboot condition, then loading of other software components is allowed to continue as per the boot sequence. For example, if no rolling reboot is detected, then a network operating system (NOS) 116 may be loaded next. Examples of NOSs include Fibre Channel operating system (FOS) provided by Brocade Communications Systems, Inc. for their Fibre Channel devices, JUNOS provided by Juniper Networks for their routers and switches, Cisco Internetwork Operating System (Cisco IOS) provided by Cisco Systems on their devices, and others. NOS 116 provides the foundation and support for networking services provided by system 100. For example, an FOS loaded on a Fibre Channel switch enables Fibre Channel-related services such as support for Fibre Channel protocol interfaces, management of hardware resources for Fibre Channel, and the like.

In one embodiment, RRC 114 may be provided as a component of NOS 116. In such an embodiment, the RRC component of NOS 116 may be loaded first, and upon detecting that a rolling reboot condition does not exist, other components of NOS 116 may be loaded.

After loading of NOS 116, in one embodiment, a platform services component 118 may be loaded as part of the boot sequence. Platform services component 118 may comprise logic for blade-level management (in a chassis-based network device with multiple blades), chassis environment setup, power supply management, messaging services, daemons support, support for command line interfaces (CLIs), etc. After platform services component 118 has been loaded, various applications may be loaded as part of the boot sequence. These may include Fibre Channel applications 120, followed by user applications 122, and potentially others.

Various other software components not shown in FIG. 1 may also be loaded in alternative embodiments as part of the boot sequence. The software components depicted in FIG. 1 are examples and not intended to be limiting. The software components that are loaded by a system as part of a boot sequence and the order in which they are loaded after the native operating system has been loaded may be dependent upon the configuration of the system and the functions provided by the system. The software components loaded in alternative embodiments and the order in which they are loaded may thus be different from those depicted in FIG. 1 and described above.

If processing performed by execution of RRC 114 detects a rolling reboot condition, then at least one software component, which otherwise would have been loaded as part of a boot sequence, is not loaded. In one embodiment, software components, which would otherwise be loaded in RAM 104 after RRC 114 as part of the boot sequence, are not loaded. This is done so as to eliminate or reduce the potential causes of rolling reboots. As discussed earlier, conditions that may trigger rolling reboots include various conditions caused due to software execution. Accordingly, by reducing the number of software components that are loaded, especially components that are likely to be the source of the trigger conditions, these software-based conditions are prevented thereby reducing the chance of a boot caused by software. For example, in the embodiment depicted in FIG. 1, native operating system 112 is generally very stable and typically not the source of conditions that may trigger an unexpected reboot. Instead, it is more likely that one or more of components 116, 118, 120, and 122 are sources of conditions that cause an unexpected reboot. By not loading these components upon detecting a rolling reboot condition, the chances of another unexpected reboot occurring due to a software-caused condition are reduced or even removed thereby putting a stop to rolling reboots. Further, many times, even though the software itself may not be directly causing reboots, it may be causing certain hardware-based states or conditions that in turn cause reboots to occur. These conditions are also reduced or removed by reducing the software components that are loaded.

Accordingly, RRC 114 provides a software-based solution for preventing rolling reboots. RRC 114 is loaded and executed as part of the boot sequence. The execution of RRC 114 determines whether a rolling reboot condition exists. Upon detecting a rolling reboot condition, at least one or more software components, which otherwise would have been loaded as part of the boot sequence, are not loaded. If a rolling reboot is not detected, then the boot sequence is executed as normal and the software components are loaded into the volatile memory associated with the processor.

Figure 2:
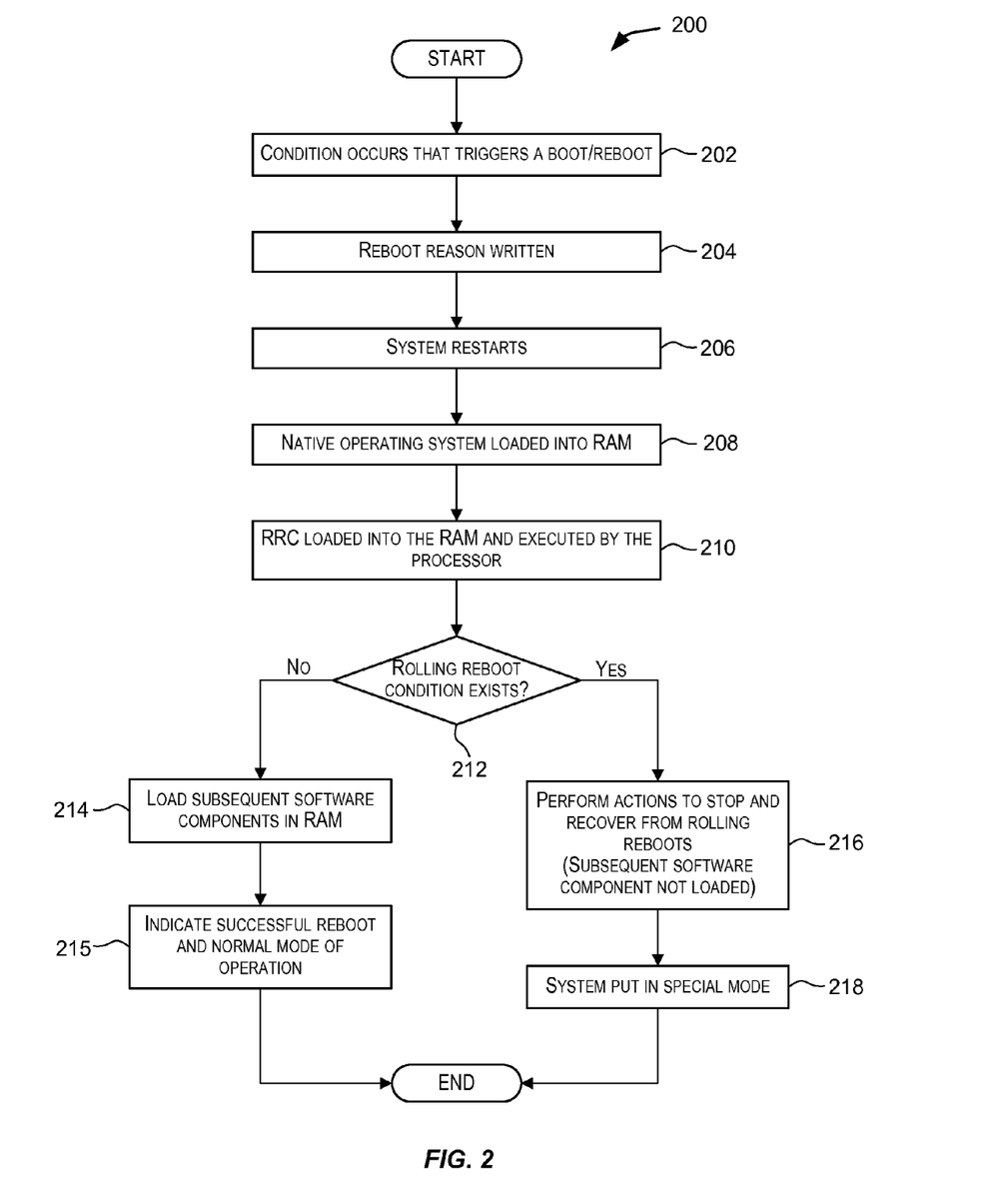
FIG. 2 depicts a simplified flowchart depicting processing performed for detecting and stopping rolling reboots according to an embodiment of the present invention.

FIG. 2 depicts a simplified flowchart 200 depicting processing performed for detecting and stopping rolling reboots according to an embodiment of the present invention. The processing for one or more steps depicted in FIG. 2 may be performed using software (e.g., code, instructions, program) executed by a processor such as processor 102. The software may be stored on a non-transitory computer-readable storage medium. The particular series of processing steps depicted in FIG. 2 is not intended to limit the scope of embodiments of the present invention. Further, the processing depicted in FIG. 2 is not intended to describe all the processing steps that may be performed as a result of a boot or reboot. Other processing steps may be performed in addition to those depicted in FIG. 2.

As depicted in FIG. 2, a condition may occur that triggers a boot/reboot (step 202). The occurrence of the condition may cause a signal to be received by system 100 that causes system 100 to perform a boot/reboot. The reboot may be an expected or an unexpected reboot. The rest of the steps depicted in FIG. 2 may be performed as part of the set of actions performed as part of the boot procedure of the system (i.e., performed as part of the boot sequence).

Under certain circumstances and before system 100 goes down, a reason for the reboot may be written to a memory location in non-volatile memory (step 204). For example, as shown in FIG. 1, a reboot reason 124 may be written to a location in non-volatile memory 106. Whether or not a reboot reason is written to memory according to 204 may depend upon the condition triggering the reboot. For example, if the reboot was triggered by a power glitch or by some hardware problem, the reboot reason may not be written, in which case step 204 is not performed. Also, in one embodiment, for a reboot caused by a software condition, whether or not the reboot reason is written may depend upon the software causing the condition. In such an embodiment, software components may be configured to write a reboot reason to the memory before the system goes down. The boot/reboot that is caused in 202 may be a soft (power is not cycled to the system) or a cold reboot (in which power is cycled to the system).

System 100 then restarts (step 206) as part of the boot sequence. At this point in time, RAM 104 associated with processor 102 is generally cleared or emptied. As part of the boot sequence, a native operating system may be loaded into the RAM (step 208). Examples of native operating systems that may be loaded include Linux, Unix, Windows OS, various variants of the aforementioned operating systems, and other operating systems. In one embodiment, the native operating system to be loaded may be stored on a boot device and the boot device identified as part of the boot sequence. The boot device is then accessed and the native operating system or kernel loaded from the boot device.

In one embodiment, RRC 114 is then loaded into RAM 104 and executed by the processor (step 210). RRC 114 may be loaded from an image stored in non-volatile memory. The code for RRC 114 may be stored on a non-transitory computer-readable storage medium. Rolling reboot-related processing is performed due to execution of RRC 114. As part of rolling reboot-related processing, a determination is made whether a rolling reboot condition exists. Details related to processing performed in 212 are described below with respect to FIG. 3. If it is determined in 212 that a rolling reboot condition does not exist, the loading of subsequent software components as part of the boot sequence is allowed (step 214). For example, for system 100 depicted in FIG. 1, if it is determined in 212 that a rolling reboot condition does not exist, then NOS 116 is loaded, followed by platform services 118, followed by Fibre Channel applications 120, followed by user applications 122, and so on. The system may then indicate successful reboot and normal mode of operation condition (step 215).

If it is determined in 212 that a rolling reboot condition exists, then one or more actions are performed that are intended to stop rolling reboots and potentially to recover from the rolling reboot condition (step 216). In one embodiment, as part of 216, at least one software component, which otherwise would have been loaded as part of the boot sequence, is not loaded. In one embodiment, software components that would otherwise be loaded in RAM 104 after RRC 114 are not loaded. In one embodiment, detection of a rolling reboot condition may cause all further loading of software components into volatile memory 104 to be not loaded. For example, in one embodiment, upon detecting a rolling reboot condition, software components such as NOS 116, platform services 118, etc., which are loaded after RRC 114 as part of the boot sequence, are not loaded.

In the embodiment depicted in FIG. 1, RRC 114 is shown as a separate software component from NOS 116. A software component shown in FIG. 1 may in turn comprise other software components that are loaded as part of loading the component. For example, in one embodiment, RRC 114 may be considered to be a component of NOS 116. In such an embodiment, RRC 114 may be loaded and executed before other components of NOS 116 are loaded. Upon detecting a rolling reboot condition, other components of NOS 116 may not be loaded. If no rolling reboot condition is detected, then other components of NOS 116 may be loaded followed by potentially other software components being loaded.

In one embodiment, system 100 may be put in a special operation mode ("rolling reboot prevention" mode) and information output to the user indicating that the system has been put into the special mode to stop rolling reboots (step 218). As part of 218, options may also be presented that enable a user to take further actions, if desired. These options may comprise options for recovering from the rolling reboot prevention mode and/or for gathering data related to the rolling reboot conditions that may be useful for further diagnosis. Various other options may also be provided. In one embodiment the following options may be provided:

(a) Collect debug/diagnostic data—Upon selecting this option, programs (which may be part of RRC 114) are executed for collecting data that may be used for debugging/diagnosing the cause of the rolling reboot condition. This may include for example, taking core dumps, panic dumps, and the like. In one embodiment, system 100 may be configured to automatically communicate the collected data to a diagnosis center (e.g., to the manufacturer of system 100) for analysis.

(b) Reboot from a secondary partition—System 100 may provide multiple partitions, each partition storing a software/firmware image that may be used for booting. One of these partitions is typically tagged as the primary partition and used as the first or primary source for booting. However, upon detecting a rolling reboot condition, a user may select this option to force a reboot to be performed using the software image in a different partition (e.g., use a secondary partition instead of the primary partition for rebooting). The rationale here is that the rolling reboot condition may have been caused by a corrupted or buggy software image in the primary partition and that the software image in the secondary partition is clean and will not result in rolling reboots.

(c) Factory default—Selection of this option causes the system to be rebooted using a factory default clean image, which is deemed to be stable and not the cause of rolling reboots.

(d) Allow the user to perform a "clean install". When this option is selected, all configuration information for the system, which is typically stored in non-volatile memory 106, is reset to factory defaults and the system is then rebooted. This is typically performed under the assumption that the firmware is in good condition and it is the configuration that is causing the rolling reboots. Accordingly, by using a "clean" default configuration set to bring the system back to a functional state, the condition causing the reboot is removed.

(e) Fix error and reboot—This option may be selected when the user is aware of a specific problem (e.g., a hardware error) that is causing the rolling reboots. For example, the user may know that the reboots are being caused by power glitches caused by a faulty power supply. In this case, the user may replace the faulty piece of hardware and then select this option to perform a reboot.

(f) Exit rolling reboot prevention mode and continue in normal mode—This option may be selected by the user when the user wants to force the system out from rolling reboot prevention mode and continue operating in normal mode.

Various other options may be provided in alternative embodiments.

Figure 3:
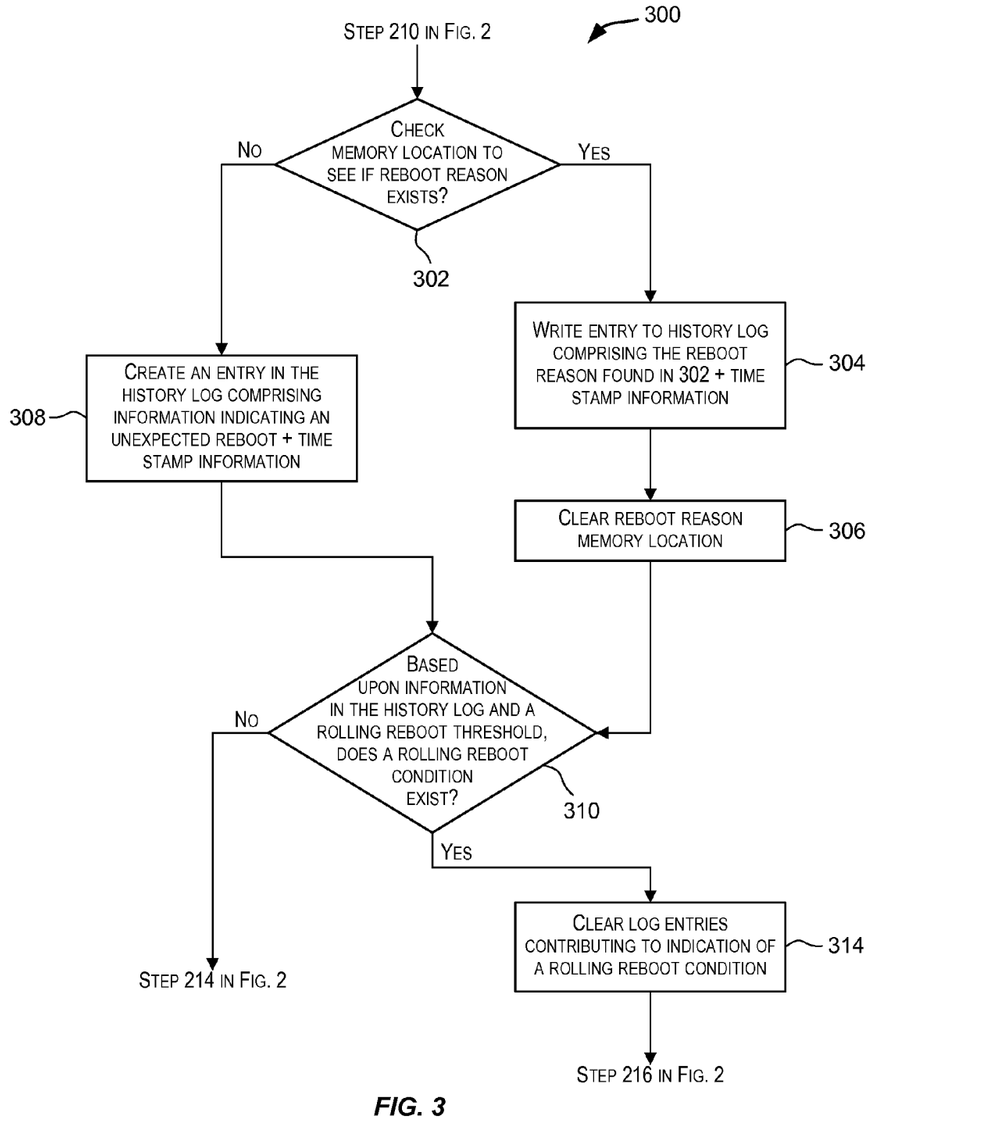
FIG. 3 depicts a simplified flowchart depicting processing performed for detecting and stopping rolling reboots according to an embodiment of the present invention.

FIG. 3 depicts a simplified flowchart 300 depicting processing performed for detecting and stopping rolling reboots according to an embodiment of the present invention. In one embodiment, the processing depicted in FIG. 3 is performed upon execution of RRC 114, which is loaded in RAM 104, by processor 102. The particular series of processing steps depicted in FIG. 3 is not intended to limit the scope of embodiments of the present invention.

As previously described, after a condition that triggers a reboot occurs, a boot sequence is executed. As part of the boot sequence, before the system goes down, a reboot reason may be written to a memory location in non-volatile memory. Accordingly, the memory location where the reboot reason would be written is checked to see if a reboot reason exists (step 302). If is it determined in 302 that a reboot reason exists, then an entry is created in a history log 126 comprising the reboot reason found in 302 (see FIG. 1) along with an associated time stamp (step 304). In one embodiment, the time stamp is the time when the entry comprising the reboot reason is written to the history log. In another embodiment, the time stamp may be the time when the reboot reason was written to the memory location prior to the system going down. The reboot reason is then cleared from the memory location (step 306).

If it is determined in 302 that a reboot reason does not exist in the memory location, then it is assumed to be an unexpected reboot. In this scenario, an entry is created in the history log 126 comprising information indicating an unexpected reboot along with associated time stamp information (step 308). The time stamp may represent when the reboot reason is written to the history log.

In the manner described above, an entry is written to history log 126 as part of each boot sequence. History log 126 thus maintains a reboot history for the system. History log 126 may comprise a number of entries with each entry corresponding to a boot occurrence for the system. In one embodiment, each entry comprises information (e.g., a reboot reason) that can be used to determine whether the reboot corresponding to that entry was an expected reboot or an unexpected reboot. Each entry also comprises or is associated with a time stamp. In one embodiment, history log 126 may be configured to store entries corresponding to the last "n" reboots, where "n" is a user-configurable value and may be set to 10, 20, etc.

As described above, processing is performed to determine if a rolling reboot condition exists. There are different ways to define when a rolling reboot condition exists. In one embodiment, a rolling reboot condition is defined to be present if a certain number of unexpected reboots occur in a specified period of time. A rolling reboot threshold may thus be configured that indicates the number of unexpected reboots and the specific period of time. This rolling reboot threshold is then used to determine whether or not a rolling reboot condition exists in the system. Both the parameters (i.e., the number of unexpected reboots and the time period) may be user-configurable.

For example, a rolling reboot threshold may be configured for a system such that a rolling reboot condition exists if 5 (or more) reboots have occurred within an hour. The rolling reboot threshold configured for a system may vary from one system to another and may also vary according to user needs. In one embodiment, information 128 related to a rolling reboot threshold may be stored in non-volatile memory 106 of system 100.

Referring back to FIG. 3, a determination is then made, based upon information in the history log and based upon the rolling reboot threshold configured for the system, whether a rolling reboot condition exists for the system (step 310). As part of the processing performed in 310, information in the history log is analyzed to see if the rolling reboot threshold is met or exceeded. As described above, in one embodiment, the rolling reboot threshold identifies a time period and a number of unexpected reboots in that time period. A period of time to be checked is then determined based upon the time specified by the rolling reboot threshold. In one embodiment, the time period to be checked is measured backwards from the time associated with the most recent reboot entry in the history log (i.e., the entry that corresponds to the present reboot being performed). In this embodiment, as part of the processing performed in 310, the entry in the history log corresponding to the last reboot is accessed and a time associated with that entry determined. This time marks the end time of the period to be analyzed. The start time for the period to be analyzed is determined based upon the end time and the time period specified by the rolling reboot threshold. In one embodiment, the start time of the period to be checked is equal to the end time (i.e., the time associated with most recent entry in the history log) minus the time period specified by the rolling reboot threshold. For example, if the rolling reboot threshold specifies 5 unexpected reboots in one hour, and the time associated with the entry corresponding to the most recent reboot indicates 8:30 PM, then:

End time=8:30 PM

Start time=8:30 PM−1 hour=7:30 PM.

The time period to be checked is thus 7:30 to 8:30 PM. The entries in the history log that fall in the 7:30 PM to 8:30 PM time period are then analyzed to identify a number of unexpected reboots. If the number of unexpected reboots that are determined equals or exceeds the number of reboots specified by the rolling reboot threshold, then a rolling reboot condition is deemed to exist and appropriate subsequent processing is performed.

If it is determined in 310 that the rolling reboot threshold is not met or exceeded (i.e., analysis of the history log indicates that the number of unexpected reboots that have occurred in the time period corresponding to the rolling reboot threshold is less than the number of unexpected reboots specified by the rolling reboot threshold) then it indicates that a rolling reboot condition does not exist. In this case, processing may continue with step 214 in FIG. 2.

If it is determined in 310 that the rolling reboot threshold is met or exceeded (i.e., analysis of the history log indicates that the number of unexpected reboots that have occurred in the time period corresponding to the rolling reboot threshold is equal to or more than the number of unexpected reboots specified by the rolling reboot threshold) then it indicates a rolling reboot condition. Processing may then continue with step 314.

If it is determined in 310 that, based upon the information in the history log, the rolling reboot threshold has been met or exceeded (i.e., the history log indicates that the number of reboots that have occurred in the time period corresponding to the rolling reboot threshold is equal to or more than the number of reboots specified by the rolling reboot threshold), then actions may be initiated as part of the boot sequence to stop the rolling reboots. As part of these actions, the entries in the history log that contributed to indication of the rolling reboot condition may be cleared (step 314). This is done so that the entries do not trigger another rolling reboot condition. Processing may then continue with step 216 in FIG. 2.

As described above, the rolling reboot threshold identifies a number of unexpected reboots over a period of time. As part of the processing performed in 310, in one embodiment, a check is made to see if the number of unexpected reboots, as determined based on the information in the history log, equals or exceeds the number specified by the rolling reboot threshold. The processing thus takes into consideration the number of unexpected reboots. It is possible that there may be expected reboots that may have also occurred during the time period being analyzed, potentially interspersed with the unexpected reboots. In one embodiment, the expected reboots are ignored and whether or not the threshold is met is determined based only upon occurrences of the unexpected reboots.

In one embodiment, rolling reboot processing is only performed as part of the boot sequence when the system operates in a special mode. For example, a special mode may be provided wherein rolling reboot-related processing is enabled and a separate mode may be provided wherein rolling reboot-related processing is disabled. The user can control which mode the system operates in. In one embodiment, CLIs may be provided that enable a user to configure system 100 to operate in the special mode or in some other mode wherein rolling reboot processing is disabled.

The system depicted in FIG. 1 and described above comprises a single processor 102 and rolling reboot processing is performed with respect to that processor. Accordingly, rebooting the processor 102 is the same as rebooting the system. The teachings described above may also be applied to a system comprising multiple processing units, e.g., multiple processors. For example, an increasing number of network devices are now provided with redundant processors, each processor having its associated RAM. This is done mainly to increase availability of the network device and to decrease downtime. For example, a system may be provided with two processors—at any time, one of the two processors is configured to operate in active mode (active processor) and the other processor is configured to operate in standby mode (standby processor). In response to various conditions, voluntary or involuntary, a failover/switchover may occur where the standby processor becomes the active processor and takes over processing performed by the active processor, and the processor previously operating in active mode becomes the standby processor. This processor redundancy and the ability to perform failovers/switchovers are meant to increase availability of the network device and provide uninterrupted services (e.g., non-stop routing (NSR)).

As part of a failover/switchover, one or both of the processors may be booted/rebooted. A persistent problem condition may cause repeated failovers to occur (referred to as rolling failovers/switchovers). This could potentially translate to one or both the processors experiencing a rolling reboot condition. Accordingly, in systems comprising multiple processors, rolling reboot processing may be performed independently for each processor. For example, a rolling reboot threshold may be configured specific to each individual processor. The rolling reboot threshold configured for one processor may be the same as or different from the rolling reboot threshold configured for another processor in the system. When a processor reboots, rolling reboot processing may then be performed as part of the processor's boot sequence, as described above, for that processor to determine if a rolling reboot condition exists for that processor and appropriate actions may then be initiated as described above. Preventing rolling reboots in this manner in effect stops rolling failovers.

In general, for a system comprising multiple processors or processing units, rolling reboot processing may be performed independently for each processing unit as part of the processing unit's boot sequence. Rolling reboot processing may be performed on a per-processing unit basis to determine whether a rolling reboot condition exists for that processing unit. Appropriate actions, as described above, may then be performed for that specific processing unit based upon the results of the rolling reboot processing.

In the embodiment described above, the reboots are categorized as either expected or unexpected and this categorization is then used to determine whether a rolling reboot condition exists. In alternate embodiments, the reboots may be categorized using ways other than just expected versus unexpected, and a rolling reboot condition may be defined based upon one or more of these categories of reboots. Accordingly, embodiments of the present invention are not restricted to only unexpected reboots. In an alternative embodiment, a specific category of reboots may be defined and rolling reboot processing applied to that specific category of reboots to determine whether a rolling reboot condition exists.

There are different ways in which a specific reboot category used for rolling reboot processing may be defined. In one embodiment, the category may be defined based upon the conditions that cause the reboot. For example, a specific category (called "software-caused reboots") may be configured comprising reboots that are caused by conditions originating in software. As part of the rolling reboot processing, based upon the reboot reasons in the history log, the number of reboots falling in this specific category may be determined and compared to the rolling reboot threshold to determine whether a rolling reboot condition exists. Appropriate actions may then be taken, as described above, if a rolling reboot condition exists. Accordingly, embodiments of the present invention are not restricted to only unexpected reboots but may be applied to user-configurable categories of reboots.

Although specific embodiments of the invention have been described, various modifications, alterations, alternative constructions, and equivalents are also encompassed within the scope of the invention. For example, while embodiments of the present invention have been described using a network device as an example, this is not intended to limit the scope of the present invention as recited in the claims. The teachings described above may be applied to any system comprising a processor that can be booted or rebooted.

Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A method performed by a system comprising a processor and an associated volatile memory, the method comprising:
   storing historical information related to one or more boots previously performed by the processor, the historical information comprising, for each boot in the one or more boots, a time associated with the boot;
   receiving, by the system, a signal to boot the processor; and
   performing a sequence of actions to boot the processor in response to receiving the signal;
   wherein the performing comprises:
      determining, by the processor, during the booting, and based upon the one or more times associated with the one or more boots, a number of boots of a particular kind that have occurred in a specific period of time;
      determining, by the processor, during the booting, whether a condition exists based upon the number of boots of the particular kind that have occurred in the specific period of time; and
      determining, by the processor, whether to load a software component into the volatile memory during the booting based upon determination of existence of the condition.

2. The method of claim 1 wherein determining whether to load the software component during the booting comprises:
   loading a set of software components excluding a software component loaded during a previous boot into the volatile memory upon determining that the condition exists.

3. The method of claim 1 wherein determining whether the condition exists comprises determining that the condition exists if the number of boots of the particular kind equals or exceeds a preconfigured threshold.

4. The method of claim 1 wherein performing the sequence of actions comprises, upon determining that the condition exists, putting the processor in a special mode.

5. The method of claim 1 wherein performing the sequence of actions comprises, upon determining that the condition exists, displaying a set of selectable options, the set of options comprising at least one of an option to gather diagnostic data, an option to reboot using an alternate partition, and an option to reboot using a default software image or default configuration.

6. The method of claim 1 wherein determining whether the condition exists involves ignoring expected boots interspersed between unexpected boots in the specific period of time.

7. A system comprising:
   a processor;
   a volatile memory configured to store software components for execution by the processor; and
   a non-volatile memory configured to store historical information related to one or more boots previously performed by the processor, the historical information comprising, for each boot in the one or more boots, a time associated with the boot;
   wherein, as part of a boot sequence, the processor is configured to:
      determine, during the boot sequence, based upon the one or more times associated with the one or more boots, a number of boots of a particular kind that have occurred in a specific period of time;
      determine, during the boot sequence, whether a condition exists based upon the number of boots of the particular kind that have occurred in the specific period of time; and
      determine whether to load a software component into the volatile memory during the boot sequence based upon determination of existence of the condition.

8. The system of claim 7 wherein, as part of the boot sequence, the processor is configured to:
   load a set of software components excluding a software component loaded during a previous boot into the volatile memory upon determining that the condition exists.

9. The system of claim 7 wherein, as part of the boot sequence, the processor is configured to determine that the condition exists if the number of boots of the particular kind equals or exceeds a preconfigured threshold.

10. The system of claim 7 wherein, as part of the boot sequence, the processor is configured to, upon determining that the condition exists, put the processor in a special mode.

11. The system of claim 7 wherein, as part of the boot sequence, the processor is configured to, upon determining that the condition exists, display a set of selectable options, the set of options comprising at least one of an option to gather diagnostic data, an option to reboot using an alternate partition, and an option to reboot using a default software image or default configuration.

12. The system of claim 7 wherein determining whether the condition exists involves ignoring expected boots interspersed between unexpected boots in the specific period of time.

13. A method performed by a system comprising a processor and an associated volatile memory, the method comprising:
    during a boot sequence, accessing a specified memory location;
    determining, during the boot sequence, whether the specified memory location indicates a reason for a most recent boot;
    in response to determining that the memory location does not indicate a reason for the most recent boot, writing, to historical information that indicates for each particular boot in a set of one or more boots performed by the processor whether the particular boot was expected or unexpected, an indication that the most recent boot was unexpected;
    determining, based upon one or more times associated with boots in the set of one or more boots in the historical information, a number of unexpected boots that have occurred in a specific period of time; and
    determining, by the processor, based upon the number of boots, whether or not to load a software component into the volatile memory during the boot sequence.

14. The method of claim 13 wherein determining whether or not to load the software component comprises:
    comparing the number of unexpected boots to a preconfigured threshold; and
    determining whether or not to load the software component into the volatile memory based upon the comparison.

15. The method of claim 14 wherein the determining based upon the comparison comprises loading a set of software components excluding a software component loaded during a previous boot into the volatile memory upon determining that the number of unexpected boots equals or exceeds the preconfigured threshold.

16. The method of claim 13 wherein determining whether or not to load the software component into the volatile memory involves ignoring expected boots interspersed between unexpected boots in the specific period of time.

17. A system comprising:
    a processor; and
    a volatile memory associated with the processor;
    wherein, as part of a boot sequence, the processor is configured to:
        access a specified memory location during the boot sequence;
        determine, during the boot sequence, whether the specified memory location indicates a reason for a most recent boot;
        write, in response to determining that the memory location does not indicate a reason for the most recent boot, to historical information that indicates for each particular boot in a set of one or more boots performed by the processor whether the particular boot was expected or unexpected, an indication that the most recent boot was unexpected;
        determine, based upon one or more times associated with boots in the set of one or more boots in the historical information, a number of unexpected boots that have occurred in a specific period of time; and
        determine, based upon the number of unexpected boots, whether or not to load a software component into the volatile memory during the boot sequence.

18. The system of claim 17 wherein the processor is configured to:
    compare the number of unexpected boots to a preconfigured threshold; and
    determine whether or not to load the software component into the volatile memory based upon the comparison.

19. The system of claim 18 wherein the processor is configured to load a set of software components excluding a software component loaded during a previous boot into the volatile memory upon determining that the number of unexpected boots equals or exceeds the preconfigured threshold.

20. The system of claim 17 wherein determining whether or not to load the software component into the volatile memory involves ignoring expected boots interspersed between unexpected boots in the specific period of time.

21. A non-transitory computer-readable storage medium storing a plurality of instructions, the plurality of instructions comprising:
    instructions that, as part of a boot sequence performed by a processor, cause the processor to:
        access a specified memory location during the boot sequence;
        determine, during the boot sequence, whether the specified memory location indicates a reason for a most recent boot;
        write, in response to determining that the memory location does not indicate a reason for the most recent boot, to historical information that indicates for each particular boot in a set of one or more boots performed by the processor whether the particular boot was expected or unexpected, an indication that the most recent boot was unexpected;
        determine, based upon one or more times associated with boots in the set of one or more boots in the historical information, a number of unexpected boots that have occurred in a specific period of time; and
        determine, based upon the number of unexpected boots, whether or not to load a software component into a volatile memory during the boot sequence.

22. The non-transitory computer-readable storage medium of claim 21 wherein the plurality of instructions comprises:
    instructions that, as part of the boot sequence performed by the processor, cause the processor to:
        compare the number of unexpected boots to a preconfigured threshold; and
        determine whether or not to load the software component into the volatile memory based upon the comparison.

23. The non-transitory computer-readable storage medium of claim 22 wherein the plurality of instructions comprises instructions that, as part of the boot sequence performed by the processor, cause the processor to load a set of software components excluding a software component loaded during a previous boot into the volatile memory upon determining that the number of unexpected boots equals or exceeds the preconfigured threshold.

24. The non-transitory computer-readable storage medium of claim 21 wherein determining whether or not to load the software component into the volatile memory involves ignoring expected boots interspersed between unexpected boots in the specific period of time.

* * * * *